United States Patent
Moench et al.

(10) Patent No.: US 8,560,180 B2
(45) Date of Patent: Oct. 15, 2013

(54) VELOCITY DETERMINATION APPARATUS

(75) Inventors: Holger Moench, Vaals (NL); Mark Carpaij, MJ's-Hertogenbosch (NL); Alexander Van Der Lee, Venlo (NL)

(73) Assignee: Koninklijke Philips N.V., Eindhoven (NL)

( * ) Notice: Subject to any disclaimer, the term of this patent is extended or adjusted under 35 U.S.C. 154(b) by 198 days.

(21) Appl. No.: 13/061,787

(22) PCT Filed: Sep. 7, 2009

(86) PCT No.: PCT/IB2009/053887
§ 371 (c)(1),
(2), (4) Date: Mar. 2, 2011

(87) PCT Pub. No.: WO2010/029484
PCT Pub. Date: Mar. 18, 2010

(65) Prior Publication Data
US 2011/0160967 A1 Jun. 30, 2011

(30) Foreign Application Priority Data
Sep. 9, 2008 (EP) .................................... 08163980

(51) Int. Cl.
*B60R 21/01* (2006.01)
(52) U.S. Cl.
USPC .......................................................... 701/45
(58) Field of Classification Search
USPC .......................................................... 701/45
See application file for complete search history.

(56) References Cited

U.S. PATENT DOCUMENTS

| | | | |
|---|---|---|---|
| 4,740,045 A | | 4/1988 | Goodson et al. |
| 5,359,404 A | * | 10/1994 | Dunne ......................... 356/5.06 |
| 5,521,696 A | * | 5/1996 | Dunne ......................... 356/5.07 |
| 5,938,717 A | * | 8/1999 | Dunne et al. .................. 701/117 |
| 6,014,601 A | * | 1/2000 | Gustafson ....................... 701/45 |

(Continued)

FOREIGN PATENT DOCUMENTS

| | | |
|---|---|---|
| WO | 2007072446 A2 | 6/2007 |
| WO | 2009090593 A1 | 7/2009 |

OTHER PUBLICATIONS

Herpel, T., Lauer, C., German, R., "A methodical framework for the design of multi-sensor systems in automotive applications", IEEE, 2008.*

(Continued)

*Primary Examiner* — Thomas Tarcza
*Assistant Examiner* — Alex C Dunn

(57) ABSTRACT

The invention relates to a velocity determination apparatus for determining a relative velocity between a first object (12), to which the velocity determination apparatus is attachable, and a second object (1). The velocity determination apparatus comprises a laser (3) having a laser cavity (4) for emitting first radiation (5), which is reflected by the second object (1), wherein the reflected radiation interferes with the first radiation (5) within the laser cavity (4). An interference signal detector (7) detects an interference signal depending on the interference within the laser cavity (4) and a velocity determination unit (8) determines the relative velocity based on the interference signal. A reliability value determination unit (9) determines a reliability value for indicating the reliability of the determined relative velocity based on at least one of the group consisting of the detected interference signal, the determined relative velocity and a characteristic of the laser.

10 Claims, 3 Drawing Sheets

(56) References Cited

U.S. PATENT DOCUMENTS

| | | | |
|---|---|---|---|
| 6,233,045 B1 | 5/2001 | Suni et al. | |
| 6,469,778 B2 * | 10/2002 | Asaka et al. | 356/28.5 |
| 6,574,540 B2 * | 6/2003 | Yokota et al. | 701/45 |
| 6,894,605 B2 * | 5/2005 | Isogai et al. | 340/435 |
| 7,071,841 B2 | 7/2006 | Haynes et al. | |
| 7,095,315 B2 * | 8/2006 | Lemke | 340/435 |
| 7,202,776 B2 * | 4/2007 | Breed | 340/435 |
| 7,511,833 B2 * | 3/2009 | Breed | 356/614 |
| 7,596,242 B2 * | 9/2009 | Breed et al. | 382/103 |
| 7,822,154 B2 * | 10/2010 | Chen et al. | 375/346 |
| 2008/0170218 A1 * | 7/2008 | Dantus et al. | 356/39 |
| 2011/0160967 A1 * | 6/2011 | Moench et al. | 701/45 |
| 2012/0280835 A1 * | 11/2012 | Raz et al. | 340/905 |

OTHER PUBLICATIONS

Fortmann et al., "Problems in Multi-Target Sonar Tracking", 1978, pp. 1182-1188.

Williams et al., "Remote Detection of Turbulence Using Ground-Based Doppler Radars", pp. 1-6, Boulder, Colorado.

Huang et al., "Effect of Angle of Incidence on Self-Mixing Laser Doppler Velocimeter and Optimization of the System", Science Direct, 2007, pp. 1662-1667, Hefei, China.

Raoul et al., "Double Laser Diode Speed Sensor for Contactless Measures of Moving Targets", 2002, pp. 363-373, vol. 4827.

Raoul et al., "A Double-Laser Diode Onboard Sensor for Velocity Measurements", 2004, vol. 53, No. 1, pp. 95-101.

* cited by examiner

VELOCITY DETERMINATION APPARATUS

FIELD OF THE INVENTION

The present invention relates to a velocity determination apparatus, a velocity determination method and a computer program for determining a relative velocity between a first object, to which the velocity determination apparatus is attachable, and a second object. The invention relates further to a vehicle comprising the velocity determination apparatus.

BACKGROUND OF THE INVENTION

The article "A Double-Laser Diode Onboard Sensor for Velocity Measurements", X. Raoul, T. Bosch, G. Plantier and N. Servagent, IEEE Transactions on Instrumentation and Measurement, Vol. 53, February 2007, discloses a self-mixing interference (SMI) sensor on a car for a real-time velocity measurement. However, this measured velocity can generally not be used in an Electronic Stability Program (ESP) or in another car safety system, because it is not ensured that the measured velocity is reliable and does not trigger a safety relevant action.

SUMMARY OF THE INVENTION

It is an object of the present invention to provide a velocity determination apparatus, a velocity determination method and a computer program, which allow using the determined velocity in an object safety system like in an ESP or like in another vehicle safety system. It is a further object of the present invention to provide a vehicle comprising the velocity determination apparatus.

In a first aspect to the present invention a velocity determination apparatus for determining a relative velocity between a first object, to which the velocity determination apparatus is attachable, and a second object is presented, wherein the velocity determination apparatus comprises:

a laser having a laser cavity for emitting first radiation for being reflected by the second object for generating reflected radiation being second radiation, wherein the first radiation and at least a part of the second radiation interfere within the laser cavity, an interference signal detector for detecting an interference signal, which depends on the interference within the laser cavity, a velocity determination unit for determining the relative velocity based on the interference signal, a reliability value determination unit for determining a reliability value for indicating the reliability of the determined relative velocity, wherein the reliability value determination unit is adapted to determine the reliability value based on at least one of the group consisting of the detected interference signal, the determined relative velocity and a characteristic of the laser.

Since the reliability value determination unit determines a reliability value, which indicates the reliability of the determined velocity, this reliability value can be used for determining whether the determined velocity can be used in an object safety system or not. Thus, the determined reliability value can be used for using the determined velocity only if the reliability value indicates that the determined velocity is reliable, thereby ensuring that the determined velocity is only used if the determined velocity is reliable and does not trigger a safety relevant action. This allows using the determined velocity in an object safety system like in an ESP or like in another vehicle safety system.

The laser having a laser cavity, the interference signal detector and the velocity determination unit form a SMI sensor, which is used for determining the relative velocity between the first object and the second object. The first object is preferentially a vehicle, to which the velocity determination apparatus is attachable, in particular, to which the velocity determination apparatus is attached, and the second object is, for example, another vehicle or an object, which is not moving like the surface beneath the vehicle, i.e. e.g. a road surface. If the second object is an object, which is not moving, the relative velocity determined by the velocity determination apparatus is the absolute velocity of the first object.

The first radiation is preferentially a first light beam emitted by the laser. The second radiation is preferentially radiation, which is reflected, in particular, backscattered by the second object, wherein at least a part of the second radiation enters the laser cavity and interferes with the first radiation present within the laser cavity.

The intensity of the laser light in the cavity is modified by the interference of the first radiation with the second radiation, which is preferentially backscattered light and which is frequency shifted by a Doppler shift resulting from the relative movement of the two objects. The interference signal depends preferentially on the intensity of the laser light within the laser cavity, which is modified by this interference. The interference signal detector is preferentially a light intensity detector for measuring the intensity of the laser light within the laser cavity, to which at least a part of the laser light within the laser cavity is directed, wherein the interference signal depends on or is the measured intensity of the laser light, which is modified by the interference within the laser cavity. The interference signal detector is preferentially located outside of the laser cavity.

The velocity determination unit is preferentially adapted to determine the fundamental frequency of the interference signal, for example, by Fourier transforming the detected interference signal. The velocity determination unit is preferentially further adapted to determine the relative velocity depending on the determined fundamental frequency by using following equation:

$$v = f \frac{\lambda}{2\cos(\phi)}, \qquad (1)$$

wherein f is the fundamental frequency, $\lambda$ is the wavelength of the laser light, and $\phi$ is the angle between the direction of the first radiation, in particular, the direction of the first light beam, and the velocity vector, which is preferentially parallel to a surface beneath a vehicle and points in the direction of the driving direction of the vehicle, if the first object is a vehicle and the second object is surface beneath the vehicle.

It is preferred that the reliability value determination unit is adapted to determine the reliability value based on the signal-to-noise ratio of the interference signal. In an embodiment, the reliability value determination unit is adapted to determine a reliability value, which indicates that the determined relative velocity is not reliable, if the signal-to-noise ratio is below a predetermined signal-to-noise threshold value. Since the determined velocity is more reliable if the signal-to-noise ratio is higher, a reliable reliability value can be determined based on the signal-to-noise ratio of the interference signal.

In a preferred embodiment, the velocity determination apparatus is adapted to apply a Fourier transformation on the interference signal, wherein the reliability value determination unit is adapted to determine the signal-to-noise ratio by determining the height of the peak of the fundamental frequency of the Fourier transformed interference signal, by determining the noise level of the Fourier transformed interference signal and by dividing the determined height by the determined noise level. Preferentially, a noise fit function is fitted to the Fourier transformed interference signal and a peak fit function is fitted to the peak of the fundamental frequency of the Fourier transformed interference signal, wherein the noise level of the fitted noise fit function and the peak of the fundamental frequency of the fitted peak fit function are used for determining the signal-to-noise ratio.

If the velocity determination apparatus is adapted to apply a Fourier transformation on the interference signal, preferentially the velocity determination unit and/or the reliability value determination unit are/is adapted to apply a Fourier transformation on the interference signal.

If the interference signal is Fourier transformed, the interference signal detector, the velocity determination unit and/or the reliability value determination unit are preferentially adapted such that the resulting spectrum is represented as a power spectrum.

The noise fit function preferentially corresponds to a signal detected by the interference signal detector, if an interference is not present within the laser cavity. This signal is generally a flat background signal, in particular, in an area of interest around the fundamental frequency of an interference signal, which is expected to be measured, if an interference is present within the laser cavity. The noise fit function is therefore preferentially a single noise value, i.e. the noise fit function is preferentially a constant function, which is fitted to the Fourier transformed interference signal. Preferentially, the part of the interference signal, which is generated by the interference within the laser cavity, is neglected by the fit, for example, by giving the points corresponding to the peak of the fundamental frequency zero weights in the fit function, or by evaluating the spectrum on a logarithmic scale, wherein the number of points containing only noise is such that the influence of the peak on the fit function is negligible. An alternative is to base the noise fit function only on a part of the spectrum that does not contain the fundamental frequency or its higher harmonics and fit this by constant fit function. For a flat noise fit function the fitting procedure is equal to take the average of the power of the Fourier transformed signal. The peak fit function is preferentially a Gaussian fit function, which is fitted to the peak of the fundamental frequency of the Fourier transformed interference signal.

It is further preferred that the velocity apparatus is adapted to apply a Fourier transformation on the interference signal, wherein the reliability value determination unit is adapted to determine the width of the peak of the fundamental frequency of the Fourier transformed interference signal and wherein the reliability value determination unit is adapted to determine the reliability value based on the determined width, in particular, in combination with the fundamental frequency. Preferentially, the reliability value determination unit is adapted to determine a larger reliability value, if the width is smaller. It is further preferred that the width is defined as the full width half maximum of the peak. Also the width of the peak is preferentially determined by fitting a peak fit function to the peak, wherein the width of the peak of the fitted peak function is used for determining the reliability value. Since the velocity determination unit determines preferentially the relative velocity based on the fundamental frequency, i.e. the frequency of the highest peak maximum, and since generally the smaller a peak width the more accurate the determination of the frequency of a peak maximum, the determined velocity is generally more reliable, if the width of the peak of the fundamental frequency is smaller. In another embodiment, the reliability value is determined depending on the ratio of the width of the peak to its fundamental frequency. If this ratio is larger, the reliability value determination unit determines a reliability value being smaller, and if this ratio is smaller, the reliability value determination unit determines a reliability value being larger. In particular, if the width of the fundamental peak is lower than its fundamental frequency, the reliability value determination unit determines a reliability value indicating that the determined relative velocity is reliable, and if the width is larger than the fundamental frequency, the reliability value determination unit determines a reliability value indicating that the determined relative velocity is not reliable.

It is further preferred that the velocity apparatus is adapted to apply a Fourier transformation on the interference signal, wherein the reliability value determination unit is adapted to determine characteristics of multiple peaks of the Fourier transformed interference signal and to determine the reliability value based on the determined characteristics of multiple peaks of the Fourier transformed interference signal. In an embodiment, the reliability value determination unit is adapted to determine the reliability value based on the area under the peak of the fundamental frequency of the Fourier transformed interference signal divided by the area under all other peaks occurring at an integer multiple the fundamental frequency of the Fourier transformed interference signal, which might indicate the presence of harmonics. In a simplified embodiment, the reliability value determination unit is adapted to determine the reliability value based on or as the area under the peak of the fundamental frequency of the Fourier transformed interference signal divided by the area under the peak of the first harmonic, i.e. under the peak at twice the fundamental frequency.

In an embodiment, the velocity determination apparatus comprises a laser characteristics determination unit, in particular, a laser power and/or laser temperature determination unit, for determining characteristics of the laser, in particular, for determining the power and/or the temperature of the laser.

It is further preferred that the characteristic of the laser, on which the determination of the reliability value is based, is at least one of the power and the temperature of the laser. Since the power and the temperature of the laser give an indication about the performance of the laser with respect to self-mixing interference, the reliability of the determined velocity can be characterized by the power or temperature of the laser. Preferentially, the reliability value depends on the ratio of the laser power to the maximum power. If the temperature of the laser is used for determining a reliability value, the reliability value indicates a reliable determined relative velocity, if the temperature of the laser is within a predetermined temperature range, which corresponds to proper operation of the laser. In an embodiment, the predetermined temperature range is [−20, 80], [−30, 80], [−40, +80], [−40, +90], [−40, +100], [−40, +110] or [−40, +120] degrees Celsius. In other embodiments, other predetermined temperature ranges can be used.

It is further preferred that the velocity determination apparatus comprises a storing unit for storing velocities of at least two velocity determinations, wherein the reliability value determination unit is adapted to determine the reliability value based on the velocities stored in the storing unit. Preferentially, the reliability value determination unit is adapted to determine a reliability value depending on an absolute difference between velocities, which have been determined successively. In an embodiment, the reliability value determination unit is adapted to determine a reliability value indicating that the determined relative velocities are not reliable, if an absolute difference is larger than a predetermined absolute difference value, which corresponds to a maximum possible acceleration.

It is further preferred that the velocity determination apparatus comprises a further laser having a further laser cavity for emitting further first radiation for being reflected by the second object for generating further reflected radiation being further second radiation, wherein the further first radiation and at least a part of the further second radiation interfere within the further laser cavity, a further interference signal detector for detecting a further interference signal, which depends on the interference within the further laser cavity, wherein the velocity determination unit is adapted to determine a further relative velocity based on the further interference signal, wherein the reliability value determination unit is adapted to compare the relative velocity and the further relative velocity yielding a comparison result and to determine the reliability value based on the comparison result. In a preferred embodiment, the determined relative velocity and the further relative velocity have been determined in the same direction and the reliability value determination unit is adapted to determine a smaller reliability value, if an absolute difference between the relative velocity and the further relative velocity is larger. It is further preferred that the reliability value determination unit is adapted to determine a reliability value indicating that the determined velocity is not reliable, if an absolute difference between the relative velocity and the further relative velocity is larger than a predetermined threshold value. The reliability value determination unit can also be adapted to compare the relative velocity and the further relative velocity by determining a correlation value, which corresponds to the correlation of the relative velocity and the further relative velocity. If the correlation value determined for the relative velocity and the further relative velocity is not within a predetermined correlation value range, the determined relative velocity and the determined further relative velocity are regarded as not being reliable. The correlation value range can be determined by calibration measurements, which are conducted such that the relative velocity and the further relative velocity are known to be reliable.

In an embodiment, the correlation value $\alpha$ is defined by following equation:

$$\alpha = \frac{v_1}{v_2} \quad (2)$$

with $v_1$ being the determined relative velocity and $v_2$ being the further determined relative velocity.

In a further embodiment, a deviation of a reliable correlation value $\alpha^R$, which has been determined by calibration using relative velocities known to be reliable, is defined as $$\Delta = v_1 - \frac{v_2}{\alpha^R}. \quad (3)$$

The reliability value determination unit is then preferentially adapted to determine a reliability value by using following equation:

$$R = 1 - \int_{-\Delta}^{\Delta} e^{\frac{x^2}{2(\sigma_1^2 + \sigma_2^2)}} dx \quad (4)$$

with $\sigma_1$ being the standard deviation of the determined relative velocity $v_1$ and $\sigma_2$ being the standard deviation of the determined further relative velocity $v_2$. The standard deviations are preferentially determined from the width of the peak of the fundamental frequency of the Fourier transformed interference signal and the fit function used to fit the peak. In a further embodiment, the reliability value determination is adapted to determine a reliability value indicating that the determined relative velocities are reliable, if the result of equation (4) is larger than a predefined threshold, and to determine a reliability value indicating that the determined relative velocities are not reliable, if the result of equation (4) is smaller than the predefined threshold. In a further embodiment, the reliability value determination is adapted to determine a reliability value indicating that the determined relative velocities are reliable, if $\Delta < 2\sigma_{1,2}$ for the standard deviations of both relative velocities, and to determine a reliability value indicating that the determined relative velocities are not reliable, if $\Delta > 2\sigma_{1,2}$ for at least one of the standard deviations. In other embodiments, instead of $2\sigma_{1,2}$ other thresholds can be predetermined with respect to $\Delta$.

In a preferred embodiment, the reliability value determination unit is adapted to provide a reliability function, which generates a reliability value and which depends on at least one of the following: the signal-to-noise ratio; the width of the peak of the fundamental frequency of the Fourier transformed interference signal; the characteristics of multiple peaks of the Fourier transformed interference signal; the laser characteristics, in particular, the laser power and the laser temperature; the absolute difference between velocities, which have been determined successively; and the above mentioned difference or correlation between the determined relative velocity and the determined further relative velocity. This overall reliability function is preferentially the product of several sub reliability functions, wherein each sub reliability function determines a reliability value based on one of the following: the signal-to-noise ratio; the width of the peak of the fundamental frequency of the Fourier transformed interference signal; the characteristics of multiple peaks of the Fourier transformed interference signal; the laser characteristics, in particular, the laser power and the laser temperature; the absolute difference between velocities, which have been determined successively; and the above mentioned difference or correlation between the determined relative velocity and the determined further relative velocity. The overall reliability function and/or the sub reliability functions are adapted to provide a reliability value between 100% and 0%, wherein 100% indicates maximum reliability and 0% indicates minimum reliability.

It is further preferred that the first object is a vehicle and that the velocity determination apparatus further comprises a vehicle safety system for controlling a safety unit of the vehicle depending on the determined relative velocity and the determined reliability value. This allows the vehicle safety system using the determined relative velocity, for example, only if the determined reliability value is above a predetermined threshold value, which indicates that the determined relative velocity is regarded as being reliable.

In a further aspect of the present invention a vehicle comprising the velocity determination apparatus as claimed in claim 1 for determining a relative velocity between a first object being the vehicle, to which the velocity determination apparatus is attached, and a second object is presented.

In a further aspect of the present invention a velocity determination method for determining a relative velocity between a first object, to which a velocity determination apparatus as claimed in claim 1 is attached, and a second object is presented, wherein the velocity determination method comprises following steps:

emitting first radiation for being reflected by the second object for generating reflected radiation being second radiation by a laser having a laser cavity, wherein the first radiation and at least a part of the second radiation interfere within the laser cavity, detecting an interference signal, which depends on the interference within the laser cavity, determining the relative velocity based on the interference signal, determining a reliability value for indicating the reliability of the determined relative velocity, wherein the reliability value is determined based on at least one of the group consisting of the detected interference signal, the determined relative velocity and a characteristic of the laser.

In a further aspect of the present invention a computer program for determining a relative velocity between a first object and a second object is presented, wherein the computer program comprises program code means for causing a velocity determination apparatus as defined in claim 1 to carry out the steps of the velocity determination method as defined in claim 11, when the computer program is run on a computer controlling the velocity determination apparatus.

It shall be understood that the velocity determination apparatus of claim 1, the vehicle of claim 10, the velocity determination method of claim 11 and the computer program of claim 12 have similar and/or identical preferred embodiments as defined in the dependent claims.

It shall be understood that a preferred embodiment of the invention can also be any combination of the dependent claims with the respective independent claim.

BRIEF DESCRIPTION OF THE DRAWINGS

These and other aspects of the invention will be apparent from and elucidated with reference to the embodiments described hereinafter. In the following drawings.

DETAILED DESCRIPTION OF EMBODIMENTS

Figure 1:
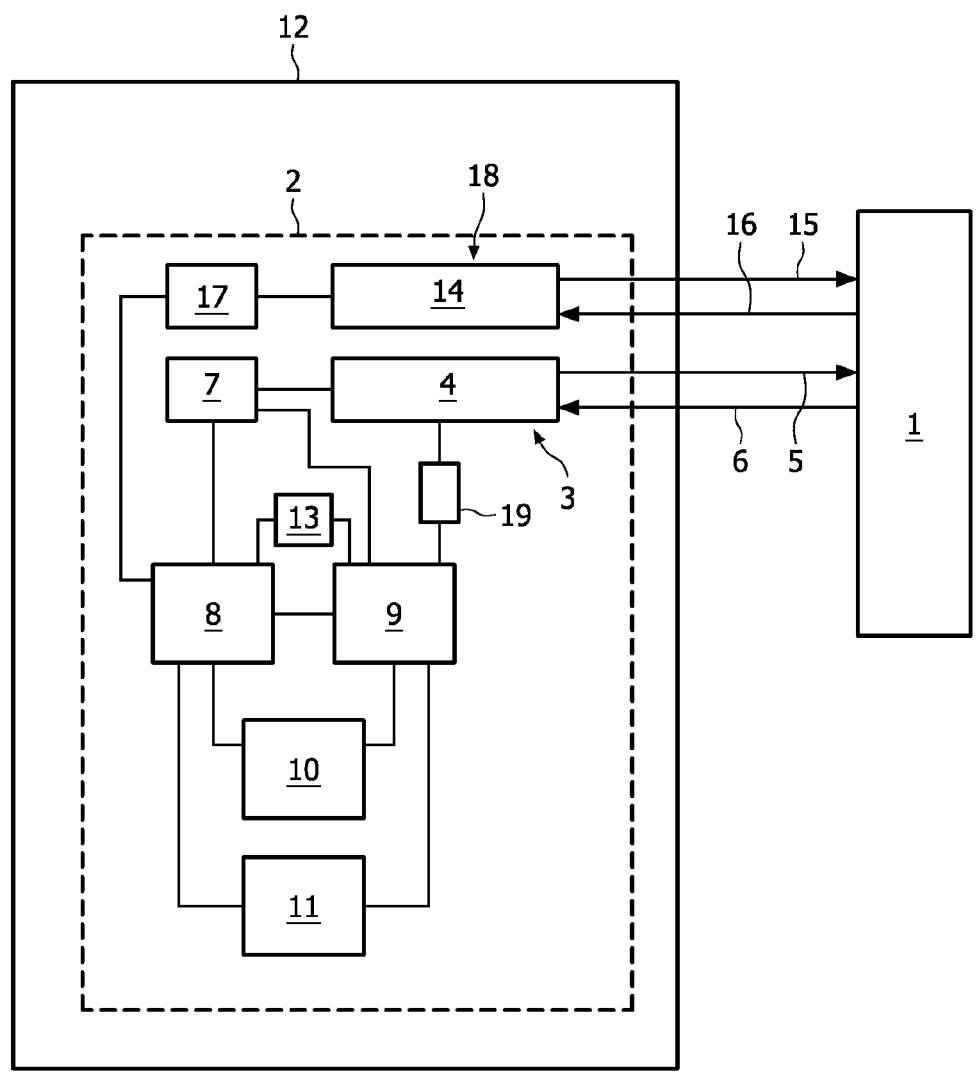
FIG. 1 shows schematically and exemplarily an embodiment of a velocity determination apparatus attached to a vehicle.

FIG. 1 shows schematically and exemplarily an embodiment of a velocity determination apparatus 2 attached to a vehicle 12. The velocity determination apparatus 2 is adapted to determine the relative velocity between the vehicle 12 and a second object 1, which is, for example, another vehicle or an object, which is not moving.

The velocity determination apparatus 2 comprises a laser 3, of which only the laser cavity 4 is shown in FIG. 1, for emitting first radiation being regarded as first light beam 5 in the following. The first light beam 5 is reflected, in particular, backscattered, by the second object 1, thereby generating reflected radiation, which is regarded as a second light beam 6 in the following. It should be noted that the second light "beam" is generally not a real beam like the first light beam, but backscattered radiation, and could also be named backscattered or reflected radiation.

The laser cavity 4 is adapted such that at least a part of the second light beam 6 can enter the laser cavity 4, wherein the first and second light beams 5, 6 interfere within the laser cavity 4. The interference within the laser cavity 4 gives rise to modulations of the laser intensity, which is measured by an interference signal detector 7 for detecting an interference signal, which depends on the interference within the laser cavity 4. The interference signal detector 7 is, in this embodiment, a photodetector, to which at least a part of the laser light is directed for measuring modulations of the laser intensity, i.e. for measuring the interference within the laser cavity 4. The photodetector converts the detected laser light into an electrical signal being the interference signal.

The velocity determination apparatus 2 further comprises a velocity determination unit 8 for determining the relative velocity based on the detected interference signal. In this embodiment, the velocity determination unit 8 is adapted to determine the fundamental frequency of the interference signal, for example, by using a Fourier transformation and to determine the relative velocity based on the determined fundamental frequency by using the above mentioned equation (1). In another embodiment, the velocity determination unit 8 can be adapted to determine the relative velocity based on the interference signal using another method, which is known for determining a relative velocity based on self-mixing interference.

Figure 2:
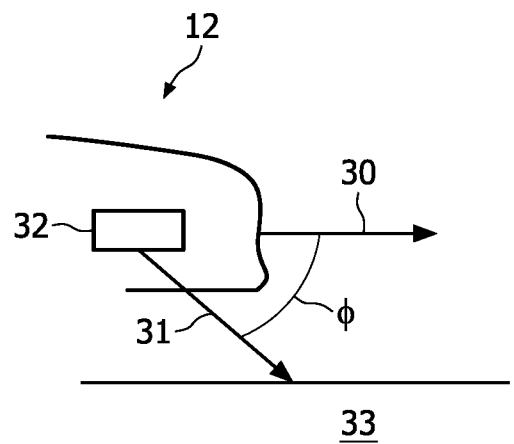
FIG. 2 shows schematically and exemplarily the spatial relation between a velocity vector and a direction of a first light beam, if the vehicle moves with respect to a surface beneath the vehicle.

In an embodiment, the second object is the surface 33 beneath the vehicle 12, of which only a part is shown in FIG. 2. For this case, FIG. 2 shows schematically and exemplarily the spatial relation between a velocity vector 30, a direction of a first light beam 31 emanating from a velocity determination apparatus 32 and the angle φ defined in equation (1). The surface 33 is preferentially a road surface. The first light beam 31 and the velocity determination apparatus 32 are similar to the first light beam 5 and the velocity determination unit 2 described above with respect to FIG. 1, except for the different directions, in which the first light beams 5 and 32 point. Also in the embodiment shown in FIG. 2, the first light beam 32 is backscattered and the velocity determination apparatus comprises several components, which correspond to the components of the velocity determination apparatus 2 and which are described with reference to FIG. 2. These further components and the further light beams are not shown in FIG. 2 for clarity reasons.

The velocity determination apparatus 2 further comprises a reliability value determination unit 9 for determining a reliability value, which indicates the reliability of the determined velocity. The reliability value determination unit 9 is adapted to determine the reliability value based on at least one of the group consisting of the detected interference signal, the determined relative velocity and a characteristic of the laser.

In this embodiment, the reliability value determination unit 9 is adapted to determine the signal-to-noise ratio of the interference signal, wherein a noise fit function is fitted to a Fourier transformed signal, which is detected by the interference signal detector 7. The noise fit function is preferentially only a single value, which is fitted to the previously mentioned signal while neglecting the interference signal present in the laser cavity. Preferentially, the part of the interference signal, which is generated by the interference within the laser cavity, is neglected during fitting by, for example, giving the points corresponding to the peak of the fundamental frequency zero weights in the fit function, or by evaluating the spectrum on a logarithmic scale, wherein the number of points containing only noise is such that the influence of the peak on the fit function is negligible. An alternative is to base the noise fit function only on a part of the spectrum that does not contain the fundamental frequency or its higher harmonics and fit this by a constant fit function. For a flat noise fit function the fitting procedure is equal to take the average of the power of the Fourier transformed signal. The reliability value determination unit 9 is preferentially further adapted to fit a peak fit function having a Gaussian shape to the fundamental peak of the Fourier transformed interference signal for determining the height of the peak. This fundamental peak is the highest peak present in the Fourier spectrum. The signal-to-noise ratio is preferentially defined as the ratio of the fitted peak height to the fitted noise value. The reliability value determination unit 9 is preferentially further adapted to generate a reliability value, which indicates that the determined relative velocity is not reliable, for example, zero, if the signal-to-noise ratio is below a predefined minimum signal-to-noise ratio, and the reliability value determination unit 9 is preferentially adapted to generate a reliability value, which indicates that the determined relative velocity is reliable, for example, one, if the signal-to-noise ratio us above the predefined minimum signal-to-noise ratio. The minimum signal-to-noise ratio is preferentially chosen such that it corresponds to a minimum signal-to-noise ratio, which is required for using the determined relative velocity in the below mentioned safety unit 20.

In a further embodiment, the reliability value determination unit 9 is adapted to determine the reliability value based on the probability that the highest peak in the Fourier spectrum, i.e. the fundamental peak, is not caused by a noise spike. It is assumed that the average noise power is known, in particular, has already been determined, for example, by using the above described constant noise fit function or by using the below described noise fit function containing the detector response function. It is further assumed that the noise is uncorrelated Gaussian, which is known or has been determined preferentially by using one of the noise fit functions described in this application. The probability distribution of the amplitude of a frequency bin in the Discrete Fourier power spectrum is preferentially given by a Gamma function. The power spectrum is preferentially determined by Fourier transforming a fixed number of time samples of the interference signal, preferably a power of two, for example, 128, 256, 512 samples. The resulting Fourier samples are complex numbers, wherein preferentially for the power spectrum the squared complex number is taken and further preferred a number of such Fourier spectra, for example, five, is averaged to reduce the noise. The Gamma distribution function depends on the number of frames used, i.e. the number of Fourier spectra over which is averaged, and the average value of the noise power per frequency bin derived from the noise fit function, wherein the probability distribution $p_{gamma}$ is preferentially defined by following equation:

$$p_{gamma}(x) = \frac{x^{M-1}}{\Gamma(M)\langle x\rangle}e^{-\frac{x}{\langle x\rangle}}, \quad (5)$$

wherein M is the number of frames over which is averaged, x is the height of the noise peak, and <x> is the average value of the noise. By using this probability distribution the probability of a frequency bin for having no peak due to noise can be defined by following equation:

$$p(noisebin <= SNR) = \int_0^{SNR} p_{gamma}(x)dx, \quad (6)$$

wherein SNR indicates the determined signal-to-noise ratio of the Fourier transformed interference signal. The reliability value can now be defined as the probability that none of the frequency bins is larger than this signal-to-noise ratio:

$$R = p(\text{noisebin}<=\text{SNR})^N \quad (7)$$

wherein N is the number of frequency bins in the Fourier spectrum. If, in another embodiment, the noise deviates from Gaussian noise, the probability distribution of equation (5) has to be amended accordingly.

In an embodiment, the Fourier spectrum, which is a power spectrum, is divided into 256 bins with 5 times spectra averaging, wherein the reliability value determination unit is preferentially adapted to determine a reliability value indicating that the determined relative velocity is not reliable, if the signal-to-noise ratio is below 5 dB.

The above mentioned formula for the reliability function can be extended, if the width of the highest peak is known as for instance determined by the signal fit function or from calibration measurements. This peak width determines the number of adjacent bins having a value above the noise floor. This information can be used to calculate the probability that not such a peak shape would arise due to noise only. This probability can be calculated by following equation:

$$p(\text{no } noisepeak) = \prod_i^n p_i(noisebin < f(i)), \quad (8)$$

wherein f(i) is the peak value found in the frequency bin indicated by i, wherein i indicates all frequency bins within the width of the fundamental peak of the interference signal, n indicates the number of frequency bins within the width of the fundamental peak of the interference signal. The number of adjacent bins indicated by i is determined from the peak fit function and consists of the pins that have a higher value, in particular a significant higher value, than the average noise value. The probability $p_i(\text{noisebin}<f(i))$ is defined by equation (6), wherein SNR is to be replaced by f(i). The reliability function can now be derived by calculating the chance that this peak can occur anywhere in the Fourier spectrum:

$$R = p(\text{no noisepeak})^{N-n} \quad (9)$$

The reliability value determination unit can also be adapted to use a noise fit function, which contains a detector response function multiplied by a white noise input and an amplifier noise input. Generally speaking most part of the spectrum consists of a flat white noise spectrum multiplied by the detector response function. This noise fit function is preferentially fitted to a signal, which is detected by the interference signal detector 7, and can be approximated by $$\text{Noisefit}(f) = \text{electronic noise}(f) + \text{WhiteNoise} \times \text{Detectorresponse}(f). \quad (10)$$

The white noise part has a flat frequency spectrum. This part normally dominates in the noise spectrum and is multiplied with the detector response function, which has a second-order transfer characteristic, meaning that the detector response is generally flat until it reaches its cut-off where the frequency dependence is significant. The detector response function is assumed to be known and, for example, stored in the reliability value determination unit. The detector response function can be determined in advance by calibration measurements. Since the detector response function is known, the fit parameter is the white noise part and the electronic noise, or if the electronic noise is known already from other calibration measurements, only the white noise part. The value of the white noise part, which is a noise power, can be used to calculate the probability that a frequency bin has given rise to the detected peak as described above, in particular, with respect to equation (5), wherein the reliability value is preferentially determined according to equations (6) and (7).

In case the noise fit function indicates a significant frequency dependence of the noise part of the signal. The known response fit function can be used to transform the fourier spectra frequency dependent noise contribution to a flat spectral contribution, by using the inverse response fit function. This flat spectral noise contribution could be regarded as a calculated noise value, which can be used for determining the signal-to-noise ratio by dividing the height of the fundamental peak by this calculated noise value.

The reliability value determination unit 9 can be adapted to determine a reliability value depending on the signal-to-noise ratio only by using one of the above described determinations, and/or the reliability value determination unit 9 can be adapted to determine a reliability value by using a function, which does not only depend on the signal-to-noise ratio, but on at least one further element, which can be used for determining a reliability value. Such a reliability function will be defined further below.

In this embodiment, the reliability value determination unit 9 is further adapted to determine the width of the peak of the fundamental frequency of the Fourier transformed interference signal and to determine the reliability value based on the determined width. A peak fit function comprising a Gaussian behavior is fitted to the peak of the fundamental frequency of the Fourier transformed interference signal and the fitted full width half maximum is determined as the fitted peak width. If the peak width is larger than a predefined width threshold, the reliability value determination unit 9 determines a reliability value indicating that the determined relative velocity is low, in particular, that the determined relative velocity is not reliable, and if the peak width is larger than the predefined width threshold, the reliability value determination unit 9 determines a reliability value indicating the determined relative velocity is high, in particular, that the determined relative velocity is reliable.

The peak fit function is preferentially defined by $$peak(f) = Ae^{-\frac{(f-f_0)^2}{2w^2}}, \quad (11)$$

wherein $f_0$ is a fit parameter for the fundamental frequency of the interference signal, A is a fit constant determining the height of the peak, and w is a fit constant from which the full width half maximum can be determined.

The reliability value determination unit can also be adapted to determine the reliability value depending on the ratio of the width of the fundamental peak to the fundamental frequency. If the peak width is larger than the fundamental frequency, the reliability value determination unit 9 determines a reliability value indicating that the determined relative velocity is low, in particular, that the determined relative velocity is not reliable, and if the peak width is smaller than the fundamental frequency, the reliability value determination unit 9 determines a reliability value indicating the determined relative velocity is high, in particular, that the determined relative velocity is reliable.

A reliability value indicating a reliable relative velocity is preferentially one, and a reliability value indicating a non-reliable relative velocity is preferentially zero.

The reliability value determination unit 9 can be adapted to determine a reliability value depending on the width of the fundamental peak only by using one of the above described determinations, and/or the reliability value determination unit 9 can be adapted to determine a reliability value by using a function, which does not only depend on the width of the fundamental peak, but on at least one further element, which can be used for determining a reliability value, for example, the signal-to-noise ratio. Such a reliability function will be defined further below.

The reliability value determination unit 9 is further adapted to determine characteristics of multiple peaks of the Fourier transformed interference signal and to determine the reliability value based on the determined characteristics. In this embodiment, the characteristics are the areas under the peaks of the Fourier transformed interference signal, which is, in this embodiment, a power spectrum. In particular, the reliability value determination unit 9 is adapted to determine the ratio of the area under the peak of the fundamental frequency to the sum of the areas under the further peaks. If this ratio is higher, the reliability value is higher. In particular, the reliability value determination unit is adapted to determine a reliability value, which indicates that the determined relative velocity is not reliable, if the above defined ratio is smaller than a predefined ratio threshold, and, in particular, the reliability value determination unit is adapted to determine a reliability value, which indicates that the determined relative velocity is reliable, if the above defined ratio is larger than a predefined ratio threshold. This predefined ratio threshold is preferentially chosen such that it corresponds to a minimum ratio, which is required for using the determined relative velocity in the below mentioned safety unit 20.

The reliability value determination unit 9 can also be adapted to determine a reliability value based on the area under the peak of the fundamental frequency of the Fourier transformed interference signal divided by the area under the peak of the first harmonic, i.e. under the peak at twice the fundamental frequency. If the resulting ratio is higher, the reliability value is higher. In particular, the reliability value determination unit is adapted to determine a reliability value, which indicates that the determined relative velocity is not reliable, if this ratio is smaller than a predefined ratio threshold, and, in particular, the reliability value determination unit is adapted to determine a reliability value, which indicates that the determined relative velocity is reliable, if the above defined ratio is larger than the predefined ratio threshold. This predefined ratio threshold is preferentially chosen such that it corresponds to a minimum ratio, which is required for using the determined relative velocity in the below mentioned safety unit 20.

The reliability value determination unit 9 can be adapted to determine a reliability value depending on the above described characteristics of multiple peaks of the Fourier transformed interference signal only by using one of the above described determinations, and/or the reliability value determination unit 9 can be adapted to determine a reliability value by using a function, which does not only depend on the characteristics of multiple peaks of the Fourier transformed interference signal, but on at least one further element, which can be used for determining a reliability value, for example, the signal-to-noise ratio and/or the width of the fundamental peak. Such a reliability function will be defined further below.

The velocity determination apparatus 2 further comprises a laser characteristics determination unit 19, in particular, a laser power and/or a laser temperature determination unit 19, for determining characteristics of the laser, in particular, for determining the power and/or the temperature of the laser. This laser characteristics determination unit 19 comprises, for example, a power measuring unit for measuring the laser power and a temperature sensor for measuring the temperature of the laser. The reliability value determination unit 9 is further adapted to determine the reliability value based on the characteristics of the laser 3 determined by the laser characteristics determination unit 19. In particular, the reliability value determination unit 9 is adapted to determine a reliability value depending on the laser power and the laser temperature. The reliability value determination unit 9 is adapted to determine a reliability value, which indicates that the determined relative velocity is not reliable, if the laser temperature is not within a predefined temperature range, which is, for example, [−40, +120] degrees Celsius, or if the laser power is below a predefined power value, which is, for example, 100 μW, and, in particular, the reliability value determination unit 9 is adapted to determine a reliability value, which indicates that the determined relative velocity is reliable, if the laser temperature is within the predefined temperature range, and if the laser power is above the predefined power value.

In an embodiment, the reliability value determination unit is adapted to determine a reliability value based only on the laser temperature or the laser power. The reliability value determination unit can be adapted to determine the reliability value as the ratio of the laser power determined by the laser characteristics determination unit 19 to the maximum laser power.

The reliability value determination unit 9 can be adapted to determine a reliability value depending on the above described characteristics of the laser only, in particular, on the laser temperature and/or the laser power, by using one of the above described determinations, and/or the reliability value determination unit 9 can be adapted to determine a reliability value by using a function, which does not only depend on the characteristics of the laser, but on at least one further element, which can be used for determining a reliability value, for example, the signal-to-noise ratio and/or the width of the fundamental peak and/or the characteristics of multiple peaks of the Fourier transformed interference signal. Such a reliability function will be defined further below.

The velocity determination apparatus 2 further comprises a storing unit 13 for storing relative velocities of at least two velocity determinations, wherein the reliability value determination unit 9 is adapted to determine the reliability value based on the velocities stored in the storing unit 13. In this embodiment, the reliability value determination unit 9 is adapted to determine a reliability value depending on a difference between velocities, which have been determined successively. The reliability value determination unit 9 is adapted to determine a reliability value, which indicates that the determined velocity is not reliable, if the difference between the successively determined velocities is larger than a predetermined difference value, which preferentially corresponds to a maximum possible acceleration. In this embodiment, the velocity determination apparatus is attached to the vehicle 12. If the difference between the determined two velocities is larger than a predetermined difference value, which corresponds to a maximum possible acceleration of the vehicle, and if the relative velocity is determined with respect to a second object 1, which is not moving, the determined relative velocities, which are, in this case, absolute velocities, are regarded as non-reliable and the reliability value determination unit 9 determines a reliability value, which indicates that the determined velocities are not reliable.

In an embodiment, the reliability value determination unit is adapted to determine a reliability value according to following equations:

$$R(v_t - v_{t-1}) = 1, \text{ if } |v_t - v_{t-1}| < a_{max} \quad (12)$$

and $$R(v_t - v_{t-1}) = 1 - \int_{a_{max}-(v_t-v_{t-1})}^{(v_t-v_{t-1})-a_{max}} e^{-\frac{x^2}{4\sigma^2}} dx, \quad (13)$$

$$\text{if } |v_t - v_{t-1}| > a_{max},$$

wherein σ is the standard deviation of the determined relative velocity $v_r$. This parameter follows from the width of the peak fit function.

The reliability value determination unit 9 can be adapted to determine a reliability value depending on the above described relative velocities of at least two velocity determinations only by using one of the above described determinations, and/or the reliability value determination unit 9 can be adapted to determine a reliability value by using a function, which does not only depend on relative velocities of at least two velocity determinations, but on at least one further element, which can be used for determining a reliability value, for example, the signal-to-noise ratio and/or the width of the fundamental peak and/or the characteristics of multiple peaks of the Fourier transformed interference signal and/or the characteristics of the laser. Such a reliability function will be defined further below.

The velocity determination apparatus 2 comprises a further laser 18 having a further laser cavity 14 for emitting a further first light beam 15. The first light beam 15 is reflected, i.e. backscattered, by the second object 1, thereby generating a further reflected light beam 16 being a further second light beam 16. The further first and second light beams 15, 16 interfere within the further laser cavity 14. The velocity determination apparatus 2 further comprises a further interference signal detector 17 for detecting a further interference signal, which depends on the interference within the further laser cavity 14. The velocity determination unit 8 is adapted to determine a further relative velocity based on the further interference signal, and the reliability value determination unit 9 is adapted to compare the relative velocity and the further relative velocity yielding a comparison result and to determine the reliability value based on the comparison result. In this embodiment, the determined velocity and the determined further velocity have been determined in the same direction and the reliability value determination unit 9 is adapted to determine a smaller reliability value, if a difference between the velocity and the further velocity is larger. In particular, the reliability value determination unit 9 is adapted to determine a reliability value, which indicates that the determined velocities are not reliable, if the difference between the velocity and the further velocity is larger than a predefined difference value, and, in particular, the reliability value determination unit 9 is adapted to determine a reliability value, which indicates that the determined velocities are reliable, if the difference between the velocity and the further velocity is smaller than a predefined difference value. This predefined difference value is preferentially chosen such that it corresponds to a maximum difference value, which is required for using the determined relative velocity in the below mentioned safety unit 20.

In an embodiment, the reliability value determination unit 9 is adapted to determine a reliability value according to following equation:

$$R = 1 - \int_{-\Delta}^{\Delta} e^{-\frac{x^2}{2(\sigma_1^2 + \sigma_2^2)}} dx, \quad (14)$$

with $\sigma_1$ being the standard deviation of the determined relative velocity $v_1$ and $\sigma_2$ being the standard deviation of the determined further relative velocity $v_2$. The standard deviations are preferentially determined from the width of peak of the fundamental frequency of the Fourier transformed interference signal and the fit function used to fit the peak.

The term $\Delta$ denotes the difference between the determined relative velocity $v_1$ and the determined further relative velocity $v_2$. It should be noted that, since in the present embodiment both velocities are measured in the same direction, $\alpha_R$ is one and equation (3) becomes $\Delta = v_1 - v_2$. If in another embodiment, the relative velocities $v_1$ and $v_2$ are not determined in the same direction, the reliability value determination unit is adapted to determine a reliability value preferentially in accordance with equations (2) to (4).

The reliability value determination unit 9 can be adapted to determine a reliability value depending on the above described determined relative velocity and the determined further relative velocity only by using one of the above described determinations, and/or the reliability value determination unit 9 can be adapted to determine a reliability value by using a function, which does not only depend on the determined relative velocity and the determined further relative velocity, but on at least one further element, which can be used for determining a reliability value, for example, the signal-to-noise ratio; the width of the peak of the fundamental frequency of the Fourier transformed interference signal; the characteristics of multiple peaks of the Fourier transformed interference signal; the determined characteristics of the laser, in particular, the laser power and the laser temperature; and the difference between the above mentioned successively determined velocities. Such a reliability function, which includes all of these elements, can be defined by following equation:

$$R_{tot} = R_1 R_2 R_3 R_4 R_5 R_6 \quad (15)$$

i.e. it can be defined as product of reliability functions, which describe the above mentioned determinations of a reliability value. The term $R_1$ represents a reliability function for determining a reliability value depending on the signal-to-noise ratio, $R_2$ represents a reliability function for determining a reliability value depending on the width of the fundamental peak of the Fourier transformed interference signal, $R_3$ represents a reliability function for determining a reliability value depending on the characteristics of multiple peaks of the Fourier transformed interference signal, $R_4$ represents a reliability function for determining a reliability value depending on the characteristics of the laser, in particular, the laser temperature and/or the laser power, $R_5$ represents a reliability function for determining a reliability value depending on the difference between the above mentioned successively determined velocities, and $R_6$ represents a reliability function for determining a reliability value depending on the difference between the above mentioned determined relative velocity and the determined further relative velocity. Each of these reliability functions $R_1 \ldots R_6$ yields a reliability value, which are multiplied for calculating a total reliability value.

In an embodiment, the reliability value determination unit is adapted to determine the total reliability value by using only one or several but not all of the reliability functions $R_1 \ldots R_6$.

The reliability value $R_{tot}$ can also be regarded as overall reliability function and the reliability functions $R_1 \ldots R_6$ can also be regarded as sub reliability functions.

The total reliability function and the reliability functions $R_1 \ldots R_6$, which are used for determining the total reliability value are preferentially adapted such that the total reliability value is a value, which can range from 0% to 100%, wherein 0% indicates minimum reliability and 100% indicates maximum reliability.

Figure 3:
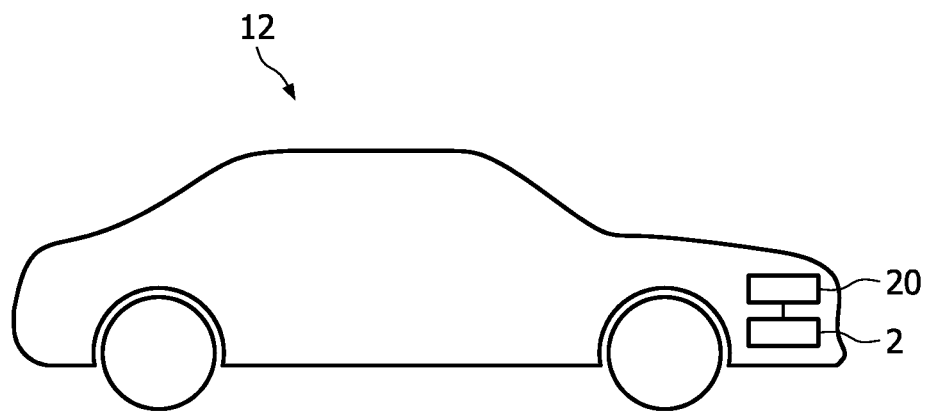
FIG. 3 shows schematically and exemplarily the vehicle, to which the velocity determination apparatus is attached

The velocity determination apparatus 2 further comprises a vehicle safety system 10 for controlling a safety unit 20 of the vehicle 12 depending on the determined relative velocity and the determined reliability value. The safety unit 20 is exemplarily and schematically shown in FIG. 3, which shows the vehicle 12, to which the velocity determination apparatus 2 is attached. It should be noted that FIG. 3 is schematically only and does not limit the location of the velocity determination apparatus 2 and/or the safety unit 20 to a certain location with respect to the vehicle 12.

In this embodiment, the safety unit 20 is an ESP unit, which considers the determined relative velocity only, if the reliability value is above a predetermined reliability threshold. This predetermined reliability threshold is preferentially chosen such that it corresponds to a reliability value, which is required for using the determined relative velocity in the below mentioned safety unit 20, in particular, without triggering a safety relevant action.

The velocity determination apparatus 2 further comprises an output unit 11, in particular, an optical output unit like a display or an acoustical output unit, which outputs the reliability value determined by the reliability value determination unit 9. In another embodiment, the output unit 11 can also be adapted to output a signal, if the reliability value is below the predetermined reliability threshold.

Figure 4:
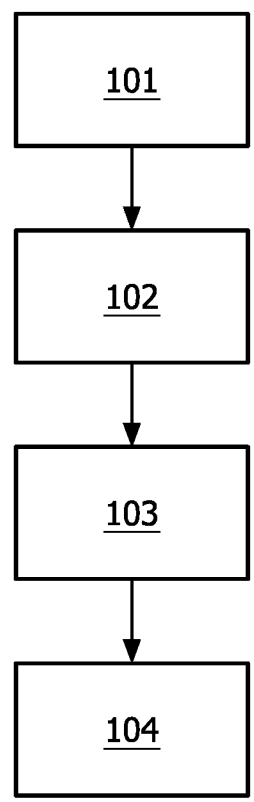
FIG. 4 shows a flow chart exemplarily illustrating an embodiment of a velocity determination method.

In the following, an embodiment of a velocity determination method will be described with reference to a flow chart shown in FIG. 4.

In step 101, the laser 3 emits the first light beam 4, which is reflected by the second object 1, wherein the reflected light beam 6 is a second light beam, which interferes with the first light beam 5 within the laser cavity 4.

In step 102, the interference detector 7 detects an interference signal, which depends on the interference within the laser cavity 4. In this embodiment, the interference signal detector 7 is a photodetector, which detects a modulation of the laser intensity generated by the interference within the laser cavity 4 and generates an electrical signal, which depends on the laser intensity, i.e. which depends on the modulation caused by the interference within the laser cavity 4.

In step 103, the velocity determination unit 8 determines the relative velocity based on the interference signal and the laser characteristics determination unit 19 determines a laser characteristic, in this embodiment, the laser power and the laser temperature.

In step 104, the reliability value determination unit 9 determines a reliability value for indicating the reliability of the determined velocity based on at least one of the group consisting of the detected interference signal, the determined relative velocity and the determined characteristics of the laser.

Although in the above described embodiments, certain characteristics of the laser and of the interference signal have been determined, which are used for determining a reliability value, in other embodiments, other characteristics of the laser and of the interference signal can be used for determining a reliability value. Furthermore, although in the above described embodiments, the vehicle safety unit is preferentially an ESP unit, in other embodiments, the vehicle safety unit can be another unit like an automatic braking system, a collision avoidance system, an airbag system, a tracking control system, an automatic parking system, a cruise control system, a traction control system et cetera.

Although in some above described embodiments, only a single threshold or minimum value or maximum value is used for determining a reliability value indicating a reliable relative velocity or a non-reliable relative velocity, additional intermediate thresholds or minimum values or maximum values and corresponding reliability values, which are preferentially larger than zero and smaller than one, can be defined to make the transition more gradual.

The vehicle is preferentially a car. But, in other embodiments, the vehicle can be another object like a truck. Furthermore, the velocity determination apparatus can also be attachable to another object, in particular, to another moving object like a ship, plane or a missile.

Other variations to the disclosed embodiments can be understood and effected by those skilled in the art in practicing the claimed invention, from a study of the drawings, the disclosure, and the appended claims.

In the claims, the word "comprising" does not exclude other elements or steps, and the indefinite article "a" or "an" does not exclude a plurality.

A single unit or device may fulfill the functions of several items recited in the claims. The mere fact that certain measures are recited in mutually different dependent claims does not indicate that a combination of these measures cannot be used to advantage.

Determinations like the velocity determination and the reliability value determination performed by one or several units or devices can be performed by any other number of units or devices. The determinations and/or the control of the velocity determination apparatus in accordance with the velocity determination method can be implemented as program code means of a computer program and/or as dedicated hardware.

A computer program may be stored/distributed on a suitable medium, such as an optical storage medium or a solid-state medium, supplied together with or as part of other hardware, but may also be distributed in other forms, such as via the Internet or other wired or wireless telecommunication systems.

Any reference signs in the claims should not be construed as limiting the scope.

The invention claimed is:

1. A velocity determination apparatus for determining a relative velocity between a first object, to which the velocity determination apparatus is attachable, and a second object, wherein the velocity determination apparatus comprises:
a laser having a laser cavity for emitting first radiation for being reflected by the second object for generating reflected radiation being second radiation, wherein the first radiation and at least a part of the second radiation interfere within the laser cavity,
an interference signal detector for detecting an interference signal, which depends on the interference within the laser cavity,
a velocity determination unit for determining the relative velocity based on the interference signal,
a reliability value determination unit for determining a reliability value for indicating the reliability of the determined relative velocity, wherein the reliability value determination unit is adapted to determine the reliability value based at least in part on the detected interference signal,
wherein the first object is a vehicle and wherein the velocity determination apparatus further comprises a vehicle safety system for controlling a safety unit of the vehicle depending on the determined relative velocity and the determined reliability value.

2. The velocity determination apparatus as claimed in claim 1, wherein the reliability value determination unit is adapted to determine the reliability value based on the signal-to-noise ratio of the interference signal.

3. The velocity determination apparatus as claimed in claim 2, wherein the velocity determination apparatus is adapted to apply a Fourier transformation on the interference signal and wherein the reliability value determination unit is adapted to determine the signal-to-noise ratio by determining the height of the peak of the fundamental frequency of the Fourier transformed interference signal, by determining the noise level of the Fourier transformed interference signal and by dividing the determined height by the determined noise level.

4. The velocity determination apparatus as claimed in claim 1, wherein the velocity apparatus is adapted to apply a Fourier transformation on the interference signal and wherein the reliability value determination unit is adapted to determine the width of the peak of the fundamental frequency of the Fourier transformed interference signal and to determine the reliability value based on the determined width.

5. The velocity determination apparatus for determining a velocity of an object as claimed in claim 1, wherein the velocity apparatus is adapted to apply a Fourier transformation on the interference signal and wherein the reliability value determination unit is adapted to determine characteristics of multiple peaks of the Fourier transformed interference signal and to determine the reliability value based on the determined characteristics of multiple peaks of the Fourier transformed interference signal.

6. The velocity determination apparatus as claimed in claim 1, wherein the reliability value determination unit is further adapted to determine the reliability value based at least in part on one or more characteristics of the laser.

7. The velocity determination apparatus as claimed in claim 1, wherein the velocity determination apparatus comprises a storing unit for storing velocities of at least two velocity determinations, wherein the reliability value determination unit is adapted to determine the reliability value based on the velocities stored in the storing unit.

8. A velocity determination apparatus for determining a relative velocity between a first object, to which the velocity determination apparatus is attachable, and a second object, wherein the velocity determination apparatus comprises:
a laser having a laser cavity for emitting first radiation for being reflected by the second object for generating reflected radiation being second radiation, wherein the first radiation and at least a part of the second radiation interfere within the laser cavity,
an interference signal detector for detecting an interference signal, which depends on the interference within the laser cavity,
a velocity determination unit for determining the relative velocity based on the interference signal, a reliability value determination unit for determining a reliability value for indicating the reliability of the determined relative velocity, wherein the reliability value determination unit is adapted to determine the reliability value based on at least one of the group consisting of the detected interference signal, the determined relative velocity and a characteristic of the laser, wherein the first object is a vehicle and wherein the velocity determination apparatus further comprises a vehicle safety system for controlling a safety unit of the vehicle depending on the determined relative velocity and the determined reliability value, a further laser having a further laser cavity for emitting further first radiation for being reflected by the second object for generating further reflected radiation being further second radiation and wherein the further first radiation and at least a part of the further second radiation interfere within the further laser cavity, a further interference signal detector for detecting a further interference signal, which depends on the interference within the further laser cavity, wherein the velocity determination unit is adapted to determine a further relative velocity based on the further interference signal, wherein the reliability value determination unit is adapted to compare the relative velocity and the further relative velocity yielding a comparison result and to determine the reliability value based on the comparison result.

9. A vehicle comprising the velocity determination apparatus as claimed in claim 1 for determining a relative velocity between a first object being the vehicle, to which the velocity determination apparatus is attached, and a second object.

10. A velocity determination method for determining a relative velocity between a vehicle, to which a velocity determination apparatus as claimed in claim 1 is attached, and a second object, wherein the velocity determination method comprises following steps:

emitting first radiation for being reflected by the second object for generating reflected radiation being second radiation by a laser having a laser cavity, wherein the first radiation and at least a part of the second radiation interfere within the laser cavity, detecting an interference signal, which depends on the interference within the laser cavity, determining the relative velocity based on the interference signal, determining a reliability value for indicating the reliability of the determined relative velocity, wherein the reliability value is determined based at least in part on the detected interference signal, and controlling a safety unit of the vehicle depending on the determined relative velocity and the determined reliability value.

* * * * *